US012699795B2

(12) United States Patent  
Blackwell, II et al.

(10) Patent No.: US 12,699,795 B2  
(45) Date of Patent: Aug. 4, 2026

(54) AUTOMATED AUTHORIZATION MANAGEMENT OF DATABASE ACCOUNTS

(71) Applicant: State Farm Mutual Automobile Insurance Company, Bloomington, IL (US)

(72) Inventors: Clete Rivers Blackwell, II, Dawsonville, GA (US); Hairong Liu, Canton, GA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 14 days.

(21) Appl. No.: 18/883,343

(22) Filed: Sep. 12, 2024

(65) Prior Publication Data

US 2025/0094615 A1 Mar. 20, 2025

Related U.S. Application Data

(60) Provisional application No. 63/539,243, filed on Sep. 19, 2023.

(51) Int. Cl.  
*H04L 29/06* (2006.01)  
*G06F 16/27* (2019.01)  
*G06F 21/62* (2013.01)

(52) U.S. Cl.  
CPC .......... *G06F 21/6218* (2013.01); *G06F 16/27* (2019.01); *G06F 2221/2113* (2013.01); *G06F 2221/2141* (2013.01)

(58) Field of Classification Search  
None  
See application file for complete search history.

(56) References Cited

U.S. PATENT DOCUMENTS

| | | | |
|---|---|---|---|
| 10,037,339 B1 * | 7/2018 | Kleinpeter | .............. G06F 16/11 |
| 11,134,119 B1 * | 9/2021 | Kulkarni | ............. H04L 67/1097 |

(Continued)

OTHER PUBLICATIONS

Bouazza, Naoufal Ben et al. Surveing the challenges and requirements for identity in the cloud. Proceedings of the 4th Edition of National Security Days (JNS4). https://ieeexplore.ieee.org/stamp/stamp.jsp?tp=&arnumber=6850127 (Year: 2014).*

(Continued)

*Primary Examiner* — Jeremiah L Avery  
(74) *Attorney, Agent, or Firm* — Lee & Hayes, P.C.

(57) ABSTRACT

Techniques described herein relate to automated management of database accounts within cloud environments and other large-scale computing environments. In such environments, an identity provider service for an organization may maintain the various roles for the users associated with the organization. As described herein, a database account synchronization system may synchronize the user accounts within the database systems of the organization based on the corresponding roles stored within the identity provider. In some examples, the database account synchronization system may periodically query the identity provider to retrieve user-role mappings for the various user groups defined by the identity provider. For each user group, the database account synchronization system may query the organization database systems, compare the user permissions of each database to the user-role mappings within the identity provider, and update the database user accounts to synchronize the databases with the identity provider.

20 Claims, 7 Drawing Sheets

(56)     References Cited

U.S. PATENT DOCUMENTS

| 12,099,566 B2 * | 9/2024 | Baek | G06N 3/047 |
| 2018/0083977 A1 * | 3/2018 | Murugesan | G06F 3/0482 |
| 2019/0098055 A1 * | 3/2019 | Pitre | H04L 63/20 |
| 2019/0098056 A1 * | 3/2019 | Pitre | G06F 21/6218 |
| 2021/0185120 A1 * | 6/2021 | Zana | H04L 63/08 |
| 2021/0240372 A1 * | 8/2021 | Loh | H03M 13/373 |
| 2021/0392142 A1 * | 12/2021 | Stephens | H04L 63/104 |
| 2023/0316261 A1 * | 10/2023 | Agbamu | G06N 3/09 |
| | | | 705/67 |
| 2023/0351037 A1 * | 11/2023 | Brooks | G06F 21/6218 |
| 2023/0368878 A1 * | 11/2023 | Molenda | G16H 70/60 |
| 2024/0211445 A1 * | 6/2024 | Yerfule | G06F 16/1734 |
| 2024/0211446 A1 * | 6/2024 | Yerfule | G06F 16/178 |

OTHER PUBLICATIONS

Lin, Jing; Qian, Jiawei. A Multi-party Secure SaaS Cloud Accounting Platform Based on Lattice-based Homomorphic Encryption System. 2021 International Conference on Public Management and Intelligent Society (PMIS). https://ieeexplore.ieee.org/stamp/stamp.jsp?tp=&arnumber=9407712 (Year: 2021).*

Ertl, Benjamin et al. Identity harmonization for federated HPC, grid and cloud services. 2016 International Conference on High Performance Computing & Simulation (HPCS). https://ieeexplore.ieee.org/stamp/stamp.jsp?tp=&arnumber=7568393 (Year: 2016).*

* cited by examiner

AUTOMATED AUTHORIZATION MANAGEMENT OF DATABASE ACCOUNTS

CROSS-REFERENCE TO RELATED APPLICATIONS

This application is a non-provisional of and claims priority to U.S. Provisional Patent Application No. 63/539,243, filed on Sep. 19, 2023, and entitled "AUTOMATED AUTHORIZATION MANAGEMENT OF DATABASE ACCOUNTS," the disclosure of which is incorporated herein by reference in its entirety for all purposes.

BACKGROUND

Organizations may use cloud computing and/or other large-scale infrastructures to support the computing needs of the organization, including providing the organization users with access to a wide range of secure resources and services. For example, the computing resources of an organization may be implemented within cloud-based environments and/or on-premise computing infrastructures (e.g., datacenter) of the organization. The computing infrastructure may include an identity provider to manage the set of authorized users associated with the organization, as well as the mappings between the users and their various roles. For instance, the authorized users within an organization may include employees having various different roles, titles, and responsibilities (e.g., administrators, managers, technical support staff, various employee teams and offices, etc.), as well as external users that may be provided access to certain organization resources or services. When a user joins or leaves the organization, or when a user changes roles, the user-role mappings within the identity repository of the identity provider can be updated to reflect the user's accurate role within the organization.

The computing environment of the organization also may include any number of database systems used to store secure data and/or access to various other resources of the organization (e.g., secure sites, services, etc.). Access to the databases can be controlled by database user accounts and associated access permissions stored within the database systems. For example, a database system may maintain a listing (or multiple listings) of database users, along with the corresponding resource access permissions (or grants) for the database user. These access permissions are enforced by the database system during any connection and/or request for secure resources in the database.

However, because the identity provider and database systems are often implemented as separate systems, the user-role mappings managed by the identity provider can become discrepant from the user access permissions of the databases. The user identities maintained by the identity provider, which generally correspond to real individuals associated with the organization, are separate from the database users defined by the database systems. As a result, when an employee or other user leaves or changes roles, the organization may update the mappings within the identity provider to reflect the change, but the database user accounts that were used by the user to access the database systems may remain unchanged.

In some systems, an organization may create database user accounts having one-to-one mappings with the users defined by the organization's identity provider. However, for such systems to be secure and effective, the user-role mappings in the organization's identity provider must be kept synchronized with the organization's database systems. To keep these data sources synchronizes, after a user role is added, removed, or modified in the identity provider, the organization may need to manually update the corresponding database user accounts. This manual updating of the database user accounts can be tedious and error-prone, especially when the organization maintains multiple independent database systems. Further, in some systems there may be a lack of approval processes and audit capabilities when users are managed manually. Management of large systems, whether implemented as multiple systems or singular large systems, can be tedious and may require complex access patterns for individual database objects in a single system or across multiple systems.

In other systems, organizations might not maintain one-to-one mappings between database user accounts and the users with the organization's identity provider. For example, an organization may generate any number of shared or ad hoc database user accounts, that can be provided to authorized users as needed, allowing those users to perform various functionality within the database. These shared or ad hoc accounts can be created, modified, or deleted by a database administrator, not based on any change in the user-role mappings of the identity provider. However, because such systems do not synchronize database accounts with user identities, the database accounts can be less secure and more difficult to track and analyze. For instance, when a particular database transaction is performed using a shared or ad hoc account, the database administrator might not be able to determine which user in the organization performed the transaction, thereby making transaction tracking and analytics more difficult and potentially compromising database security.

SUMMARY

To address these and other problems and inefficiencies, this disclosure describes systems and techniques for automated management of database accounts within cloud environments and other large-scale computing environments. Identity provider services may be implemented in various computing environments to manage and maintain mappings between the various roles in an organization and the users associated with the organization. In such computing environments, the organization also may implement any number of database systems operating separately and independently from the identity provider. As described herein, a database account synchronization system may be configured to synchronize the database user accounts within the database systems of the organization, based on the corresponding user-role mappings stored by the organization's identity provider. In various examples, the database account synchronization system may periodically query the identity provider to retrieve the user-role mappings for various user groups defined by the organization. For each user group, the database account synchronization system may query one or more database systems, and then compare the user accounts within the databases to the user-role mappings from the identity provider. Based on the comparison, the database account synchronization system may update the database user accounts as needed to synchronize the organization's database user accounts with the current user-role mappings of the identity provider.

In some examples, the database account synchronization system may include a trigger configured to periodically initiate requests to synchronize the database user accounts based on the current state of the identity provider. The periodic trigger may be configured to execute a time-based trigger (e.g., to perform synchronizations every N minutes, hours, or days), and/or an event-based trigger (e.g., to perform synchronizations in response to particular API calls of the identity provider, etc.).

Within an identity provider, the user associated with an organization (e.g., employees, administrators, contractors, external partners, etc.) may be assigned to one or more roles indicating their level of access to the data and resources of the organization. For instance, within identity provider a single user can be mapped to multiple different roles indicating that the user is an employee, a manager, a member of a particular product/division, etc.). When the user's role within the organization changes, the identity provider can be updated by removing all of the user's role mappings (e.g., when the user leaves the organization), or by adding/remove any subset of the user's role mappings while leaving other mappings unchanged. To synchronize the database user accounts, the database account synchronization system may iteratively retrieve the user-role mappings for each role defined in the identity provider, and compare the mappings to corresponding listings of users in the organization's database systems. Therefore, regardless of how or by whom the user's role is updated within the identity provider (e.g., the user leaving the organization, joining the organization, or changing positions/roles within the organization, etc.), the database account synchronization system can perform the appropriate modifications to synchronize the database user accounts. Further, the synchronizations described herein may be effective for any number of user roles defined in the identity provider and/or for any number of independent database systems maintained by the organization, including those having database proxies and those without proxies.

In various examples, the database account synchronization system may be implemented within a cloud computing environment of the organization. As described below, in such examples the database account synchronization system may access the identity provider to receive an encrypted token (e.g., a JSON web token) containing source identity information associated with a user of the organization. The database account synchronization system may use the token to log in to an identity/access management system of the cloud provider, to obtain cloud provider credentials associated with the user. The cloud provider credentials then may be used to access the organization's database systems and perform any necessary synchronization. Thus, in these examples, the database account synchronization system can operate in the cloud-based environments of the organization, and may synchronize the database user accounts of the organization without requiring the database systems to store the user's organization passwords.

As illustrated by the features and examples in this disclosure, the techniques described herein provide technical advantages that improve the security and functionality of the computing systems and environments used by large organizations. As described herein, the database account synchronization system may perform automatic synchronization of database user accounts based on the current user-role mappings maintained by the identity provider service of the organization. By performing the periodic automated synchronization, the techniques herein may prevent data security vulnerabilities caused by users leaving or changing roles within the organization. Additionally, the techniques herein provide a one-to-one mapping solution between the users of the organization in the identity provider, and the database user accounts within the organization's database systems. This provides additional advantages of improved database tracking and analysis over systems that generate shared or ad hoc database user accounts to provide user access. By implementing a one-to-one mapping, each database connection can be accurately linked back to the corresponding authenticated user within the identity provider of the organization, thereby reducing overhead and removing the potential security issues caused by the creation of ad hoc and shared database users. Further, the techniques herein may be compatible with any cloud provider used by an organization, and with any number of separate and independent database systems. In various examples, the database account synchronization system may be agnostic with respect to cloud providers, and with respect to the number of databases, different database systems, and database storage environments (e.g., public cloud, private cloud, on-premise data storage, etc.) used by the organization.

DETAILED DESCRIPTION

Figure 1:
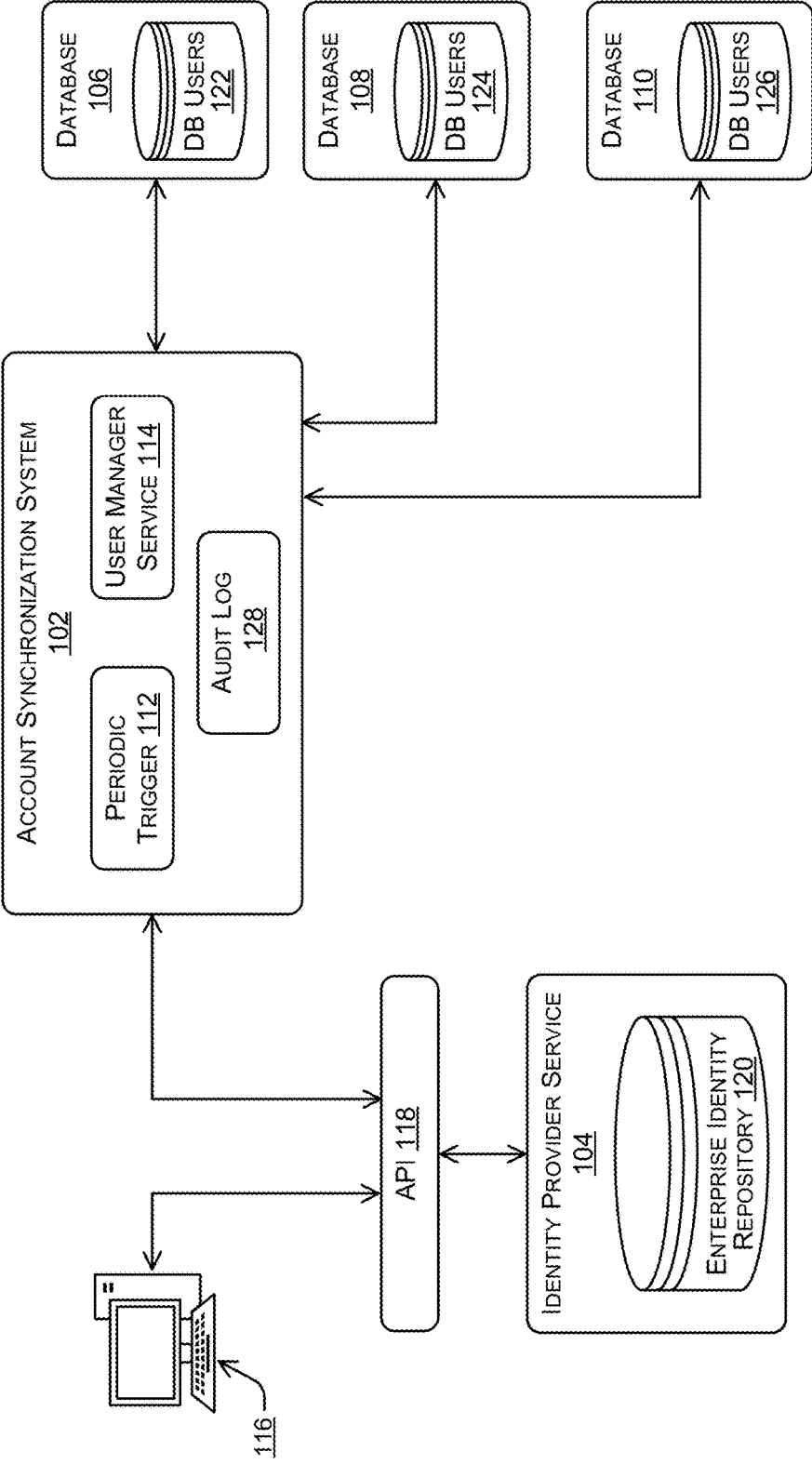
FIG. 1 depicts an example computing environment including an account synchronization system configured modify database user accounts based on changes to the user-role mappings in an enterprise identity repository, in accordance with one or more examples of the present disclosure.

FIG. 1 illustrates an example computing environment 100 in which an account synchronization system may be used to synchronize the database user accounts in one or more database systems, based on the user-role mappings maintained by an identity provider. In some examples, the computing environment 100 may represent a portion of a computing infrastructure used by an enterprise or other large-scale organization to perform identity and access management. In addition to the account synchronization system 102, the computing environment 100 in this example includes an identity provider service 104 configured to store and verify user identities for the organization, and a number of secure database systems (e.g., database system 106, database system 108, and database system 110) storing secure data and other resources of the organization. As described in more detail below, the account synchronization system 102 may include various components such as periodic trigger 112, a user manager service 114, and an audit log 128, collectively configured to synchronize the database user accounts within the database systems 106-110 based on the user-role mappings maintained by the identity provider service 104.

The identity provider service 104 may create, maintain, and manage identity information for any number of users associated with the organization. In some examples, the identity provider service 104 may be a cloud-hosted service provided by the organization, and may include cloud-based authentication services (e.g., OpenID Connect (OIDC), OAuth, single-sign-on (SSO), etc.) to perform user authentication functionality for the organization. Within the identity provider service 104, an enterprise identity repository (EIR) 120 may store (among other things) a set of mappings between the users of the organization and various organization-defined roles that can control the sets of resources the users can access.

Roles may be organization-defined groups that can represent the relationship of a user to the organization and/or can represent any number of user classifications or subgroups within the organization used to control access to resources. For example, the EIR 120 may include mappings of certain users to roles indicating employee statuses (e.g., employee, contractor, external partner, etc.). Additional examples of user-role mappings in the EIR 120 may include mappings of users to various position/title roles within the organization (e.g., senior employees, managers, administrators, etc.), mappings of users to various security levels within the organization (e.g., medium security, high security, etc.), and/or mappings of users to various product groups, divisions, or offices of the organization (e.g., legal department, accounting department, enterprise server group, technical support group, London office, New York office, etc.).

As shown in this example, the identity provider service 104 may include an application programming interface (API) 118 (or multiple APIs) providing the functionality for authorized users within the organization to retrieve, set, and/or modify the various user-role mappings stored within EIR 120. For instance, using a client device 116, an authorized user may access the API 118 to change the user-role mappings within the EIR 120. Such changes may be performed by authorized users such as human resources users, managers, or administrators of the organization, to reflect an employee joining the organization, leaving the organization, or changing roles within the organization (e.g., changing jobs, moving offices, etc.).

The computing environment 100 also includes databases 106-110, each of which may include store secure resources of the organization, and may include the components and functionality to control access to the respective resources. For example, databases 106-110 may represent secure data stores, or internal sites or services of the organization. As noted above, databases 106-110 may be implemented using separate (e.g., non-homogeneous) database systems or servers, and may operate in different computing systems or environments (e.g., different clouds, different datacenters, etc.). Additionally, each of the databases 106-110 may include a separate listing (or multiple listings) including the database user accounts and/or access permissions of the authorized users of the database. For instance, the first database 106 includes a first set (e.g., listing or table) of database user accounts 122 authorized to access various resources of the first database 106, the second database 108 includes a second data store of database user accounts 124 authorized to access various resources of the second database 108, and the third database 110 includes a third data set of database user accounts 126 authorized to access various resources of the third database 110. The sets of database user accounts 122-126 can include any number of programmatic users (e.g., used by automated services/tools of the organization to connect to and access the database), and any number of support users (e.g., user accounts corresponding to connections and access requests associated with individual users of the organization). Because each database 106-110 maintains its own sets of user accounts, the sets of database user accounts 122-126 may include different sets of users, as well as different names, aliases, and/or credentials representing the same user.

As noted above, the database user accounts 122-126 need not correspond one-to-one to the users authorized to access within the identity provider. For example, one set of credentials within the organization (e.g., programmatic or user credentials) may be authorized to access and/or modify the EIR 120, but might not be authorized to access the databases 106-110. Similarly, another set of programmatic or user credentials may be authorized to access and/or modify one (or more) of the databases 106-110, but might not be authorized to access the identity provider service 104.

As noted above, the computing environment 100 may correspond to various types of software development and/or deployment environments, including a public cloud environment, private cloud environment, hybrid cloud environment, cloud containers (e.g., accounts), and/or on-premise computing infrastructures, or any combination of such computing environments into which access and identity control software may be built and executed.

As noted above, an authorized user using a client device 116 may access the identity provider service 104 (e.g., via API 118) to change various user-role mappings within the EIR 120. Such changes may include adding, removing, or modifying user-role associations in the EIR 120 based on new users joining the organization, other users leaving the organization, and/or users changing roles (e.g., positions, offices, access levels, etc.) within the organization.

In response to such changes to the user-role associations in the EIR 120, the account synchronization system 102 may be configured to detect and/or identify the changes, and update the sets of databases 106-110 so that the sets of database user accounts 122-126 are synchronized with the EIR 120. In some examples, the account synchronization system 102 may include a periodic trigger 112 configured to initiate sets of operations within a user manager service 114 to synchronize the database user accounts with the current user-role mappings of the identity provider service 104. The periodic trigger 112 may include a time-based trigger configured to cause the synchronization operations every N minutes, N hours, N days, etc., and/or may include an event-based trigger in which the synchronization operations are initiated in response to certain types of connections to the identity provider service 104 (e.g., administrator connections, connections from specific users, etc.), and/or in response to modifications of particular data (e.g., user listings or other user-role mapping tables) within EIR 120. In some examples, the account synchronization system 102 may access the identity provider service 104 via the same API or set of APIs used by the client device 116 (e.g., API 118). In other examples, the account synchronization system 102 may use a different set of APIs to access the identity provider service 104. In either case, the account synchronization system 102 may store credentials to access the identity provider service 104 as a programmatic user, having (at least) read access to the EIR 120.

As described in more detail, the operations performed by the user manager service 114 may include initiating a programmatic user to access the EIR 120 and retrieve the current user-role mappings for some or all of the roles defined by the organization. In some examples, a user-role mapping may include a listing of users associated with a particular role (e.g., a listing of all administrators, a listing of managers, a listing of all employees, etc.). The user manager service 114 may then access one or more of the databases 106-110 to compare the current user-role mappings to the corresponding database user accounts 122-126. In some examples, the user manager service 114 can use the user prefixes within the database user accounts 122-126 to determine which access permissions/roles the various users have within the databases 106-110. When discrepancies are detected between the user-role mappings and the access permissions of the database user accounts 122-126, the user manager service 114 can modify the database user accounts 122-126 appropriately to synchronize the user-role mappings maintained by the identity provider service 104 with the user accounts within the organization's various databases 106-110.

As noted above, the user manager service 114 can be configured to perform the synchronization periodically for any number of the roles defined by the identity provider service 104 (e.g., any subset or all roles) and for any number of the databases (e.g., any subset or all databases) maintained by the organization. For instance, the account synchronization system 102 may implement different periodic timers or may implement different event-based triggers, so that different roles can be synchronized at different times. These examples may provide the organization with additional flexibility and/or reduced computing overhead, by allowing the organization to synchronize higher-priority and/or more secure roles (e.g., system administrators, managers, access to secure and confidential data stores, etc.) more frequently, and to synchronize lower-priority roles and protect less secure resources less frequently.

The audit log 128 may be configured to track and store any or all actions performed by the various components of the account synchronization system 102. The actions tracked by the audit log 128 may include, but are not limited to, the executions of the periodic trigger 112, executes, the particular queries issued to and/or user-role mappings retrieved from the identity provider service 104, the database connections made and queries submitted to the various database systems 102-106, and the user account management actions taken (e.g., adding users, removing users, updating user permissions, etc.) on any of the database user accounts 122-126. For each such action, the audit log 128 may determine and store a time associated with the action, a result or status of the action (e.g., successful or failed), and/or client or network access data (e.g., network port, network protocol, client IP address, client OS, etc.).

Using data from the audit log 128, in various examples, the account synchronization system 102 may provide additional capabilities for analyzing and resolving potential errors within the account synchronization system 102, and for detecting and analyzing malware or other malicious attacks targeting the identity provider service 104 and/or the database systems 102-106 of the organization. For example, the account synchronization system 102 may retrieve and correlate the data from the audit log 128 with the additional data from audit logs of the identity provider service 104 and/or the database systems 102-106, to create a holistic data view indicating which user identities and/or which database user accounts had access to which resources of the organization during any specified time period. For instance, the audit log 128 may include a software utility (e.g., function or API) that received a particular resource identifier and determined/output a complete listing of the user identities of the organization that had access to the resource at various different times. Similarly, the audit log 128 may include another software utility that received a particular user identity and determined/output the complete listing of the resources within the organization that the user identity was able to access at various different times.

As noted above, the audit log 128 also may be used for pattern analysis and detection of malware or malicious attacks on the organization. For instance, the audit log 128 may detect when database user accounts 122 are changed, including which accounts, which changes, and how often, to determine whether the change was accidental or malicious is nature, and may take an appropriate action based on the pattern of database user account changes (e.g., altering an administrator, restricting an identity or freezing an account, outputting a notification regarding best practices for database account security, etc.). In some examples, the audit log 128 also may include or may be a participant in a security and information event management (SIEM) system, and may include (or may collaborate with) machine learning-based resourced to analyzing user identity and database account access data, drift detection, malicious attacks, etc.

Figure 2:
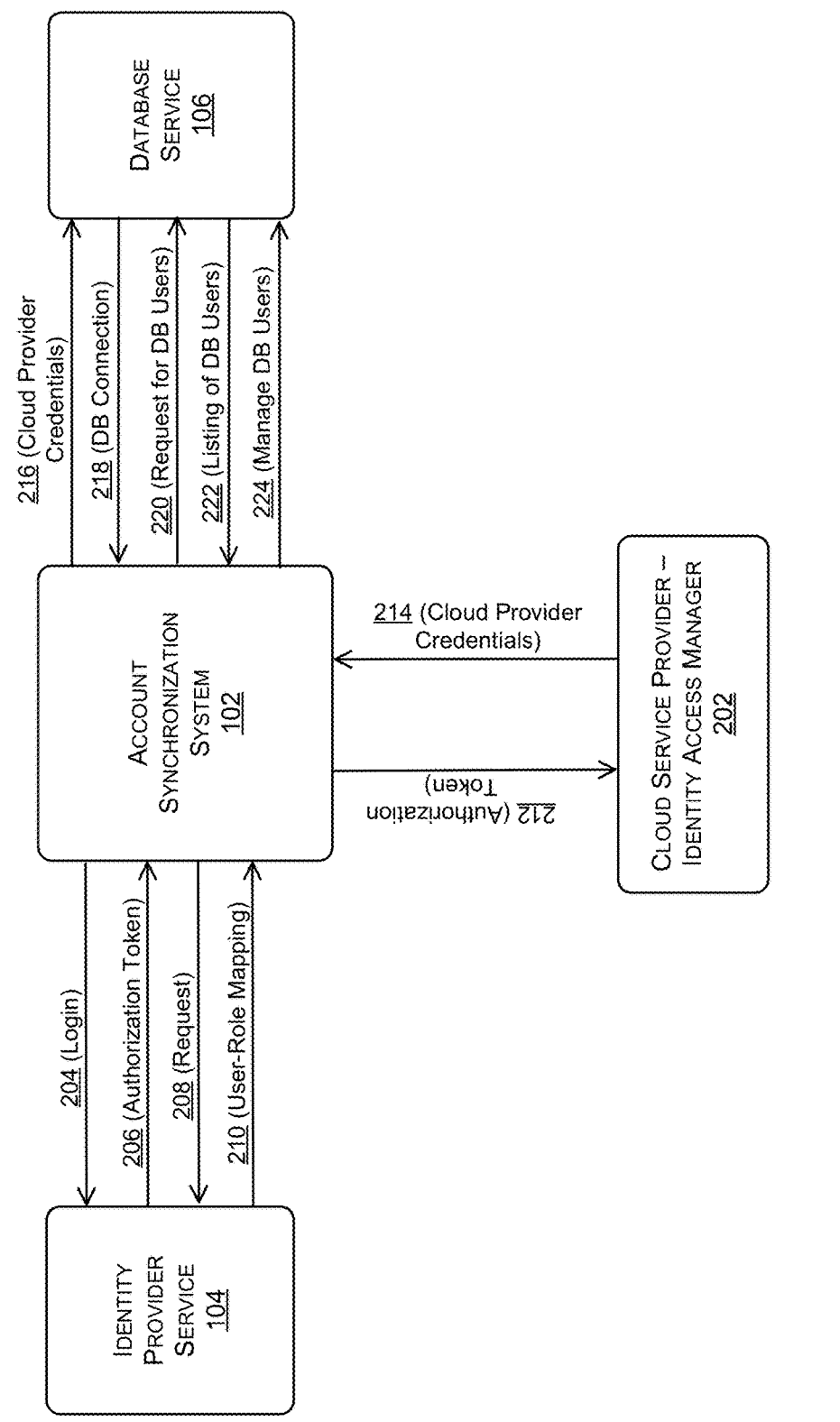
FIG. 2 depicts an example technique for using an account synchronization system to retrieve and compare user-role mappings from an identity provider service to database user accounts from a database service, in accordance with one or more examples of the present disclosure.

FIG. 2 depicts an example technique in which an account synchronization system 102 may be used to retrieve and compare the user-role mappings from an identity provider service 104 to a set of database user accounts from a database 106. In some examples, the computing environment 200 may be a cloud-based computing environment corresponding to the same computing environment 100 described above. As described above, the account synchronization system 102 may operate in cloud-based environments or various other computing environments. In this example, the cloud-based computing environment 200 may be provided by a cloud service provider, as an environment into which some or all of the computing infrastructure of the organization can be deployed and accessed by the users of the organization from client devices via various locations and various access networks.

As shown in this example, the computing environment 200 includes an identity access manager (IAM) 202 of the cloud service provider. The identity access manager 202 may perform authentication and identity management for the cloud-based environment 200, including allowing the organization to set access control for various workloads within the environment, and set permissions to grant and revoke security credentials for users and/or cloud provider accounts. In some examples, the identity access manager 202 may provide single-sign-on (SSO) functionality, by performing user authentication and authorization at a central access point within the cloud-based environment 200, after which authorized users can access various other cloud resources (e.g., database systems) using their cloud provider credentials provided by the IAM 202.

In this example, FIG. 2 illustrates an example sequence of operations that may be performed by the account synchronization system 102 to synchronize the database user accounts with a database 106 with the corresponding user-role mappings maintained by the identity provider service 104. The sequence of operations shown in this example may be initiated by a periodic trigger 112 and performed by a user manager service 114, as described above. In this example, the account synchronization system 102 initially may login and connect to the identity provider service 104 in operation 204, using the programmatic user associated with the account synchronization system 102 (e.g., having administrative credentials). In some examples, the connection to the identity provider service 104 in operation 204 may be performed via an OpenID Connect (OIDC) login or other cloud-based authentication services. In some cases, the account synchronization system 102 may use a JavaScript software development kit (SDK) to log in to the identity provider service 104. In some examples, the login in operation 204 may be performed via a custom-deployed website associated with the identity provider service 104. Additionally or alternatively, the identity provider service 104 (e.g., MICROSOFT ENTRA ID®) may be configured to log the user in without a user interface.

In response to the login in operation 204, the identity provider service 104 may provide an authorization token back to the account synchronization system 102 in operation 206. In some examples, the token returned in operation 206 may be a JSON web token or other encrypted token that contains source identity information (e.g., an email address) associated with the programmatic user.

After the connection is made with the identity provider service 104 in operation 204, the account synchronization system 102 then may transmit a request in operation 208 for a list of users in the EIR 120 within a particular role (e.g., DB support users, employees, managers, administrators, users in a particular group, product, division, or office, etc.). At operation 210, the account synchronization system 102 may retrieve the listing of users for the requested role from the identity provider service 104.

Using the authorization token received in operation 206 (e.g., a JSON web token), the account synchronization system 102 may access the IAM 202 of the cloud service provider in operation 212. In response to receiving the authorization token containing the source identity information of the user, the IAM 202 may use the token to determine corresponding cloud provider credentials for the programmatic user. In operation 214, the IAM 202 may transmit the cloud provider credentials back to the account synchronization system 102.

At operation 216, the account synchronization system 102 may access the database 106 using the cloud provider credentials received from the IAM 202 of the cloud service provider. In some examples, the user manager service 114 may be configured to generate an authentication token (e.g., an encrypted security token) based on the cloud provider credentials. Thus, in operation 216, the logging in to the database 106 may be performed as a cloud provider user (e.g., not using the organization credentials of the user). Such examples where the account synchronization system 102 uses cloud provider credentials to access databases, may provide additional advantages in that the databases need not store the organization credentials (e.g., logins and passwords) of the users in the organization.

After connecting to the database 106 in operation 218, the account synchronization system 102 may query the database 106 in operation 220 to retrieve the set of user accounts associated with the role (or roles) for which user-role mappings were received in operation 208. In some examples, the account synchronization system 102 may query the database 106 for a specific user account prefix matching a particular role defined by the identity provider service 104. Within the database 106, the user accounts having the prefix may correspond to the current set of database users assigned to the particular role. In operation 222, account synchronization system 102 may receive the requested listing of database user accounts from the database 106. The account synchronization system 102 then may compare the user-role mappings received from the identity provider service 104, with the corresponding listings of database user accounts. For any discrepancies between the database user accounts and the user-role mappings, the account synchronization system 102 may use the connection established with the database in operation 216 (or a separate connection) to add, remove, or modify the database user accounts accordingly in operation 224.

In the example shown in FIG. 2 and/or other examples herein, the account synchronization system 102 may use the same or different sets of credentials to access the identity provider service 104, the IAM 202 of the cloud service provider, and the various database(s) 106. For instance, the account synchronization system 102 may store a first set of credentials to login to and access the identity provider service 104 as a programmatic user having read access to the EIR 120. The account synchronization system 102 then may use different login credentials to login to and access the IAM 202 of the cloud service provider (having at least read access), and a different third set of login credentials to connect to the database 106 having administrator access to manage the database user accounts 122.

The operations 204-224 relate to synchronizing a single role within the identity provider service 104 with the listing of database user accounts from a single database 106. However, as noted above, the account synchronization system 102 may be configured to synchronize all of the user roles managed by the identity provider service 104 (or any desired subset of the user roles). Additionally, the account synchronization system 102 can perform similar operations to synchronize the database user accounts of any number of separate and independent databases, including databases stored in different clouds, different datacenters, and within different networks, etc., as well as databases using different database server systems and architectures. For example, in some implementations the account synchronization system 102 may be configured to synchronize a particular type/build of identity service provider 104 (e.g., MICROSOFT AZURE ACTIVE DIRECTORY®, MICROSOFT ENTRA ID®, etc.) with a particular type/build of relational database systems (e.g., POSTGRESQL DATABASE). However, an additional advantage of the account synchronization system 102 is agnostic with respect to role types, cloud-based environments, database systems, and/or database proxies, and may be configured for compatibility with any combination of identity provider services, database systems, and computing environments.

Figure 3:
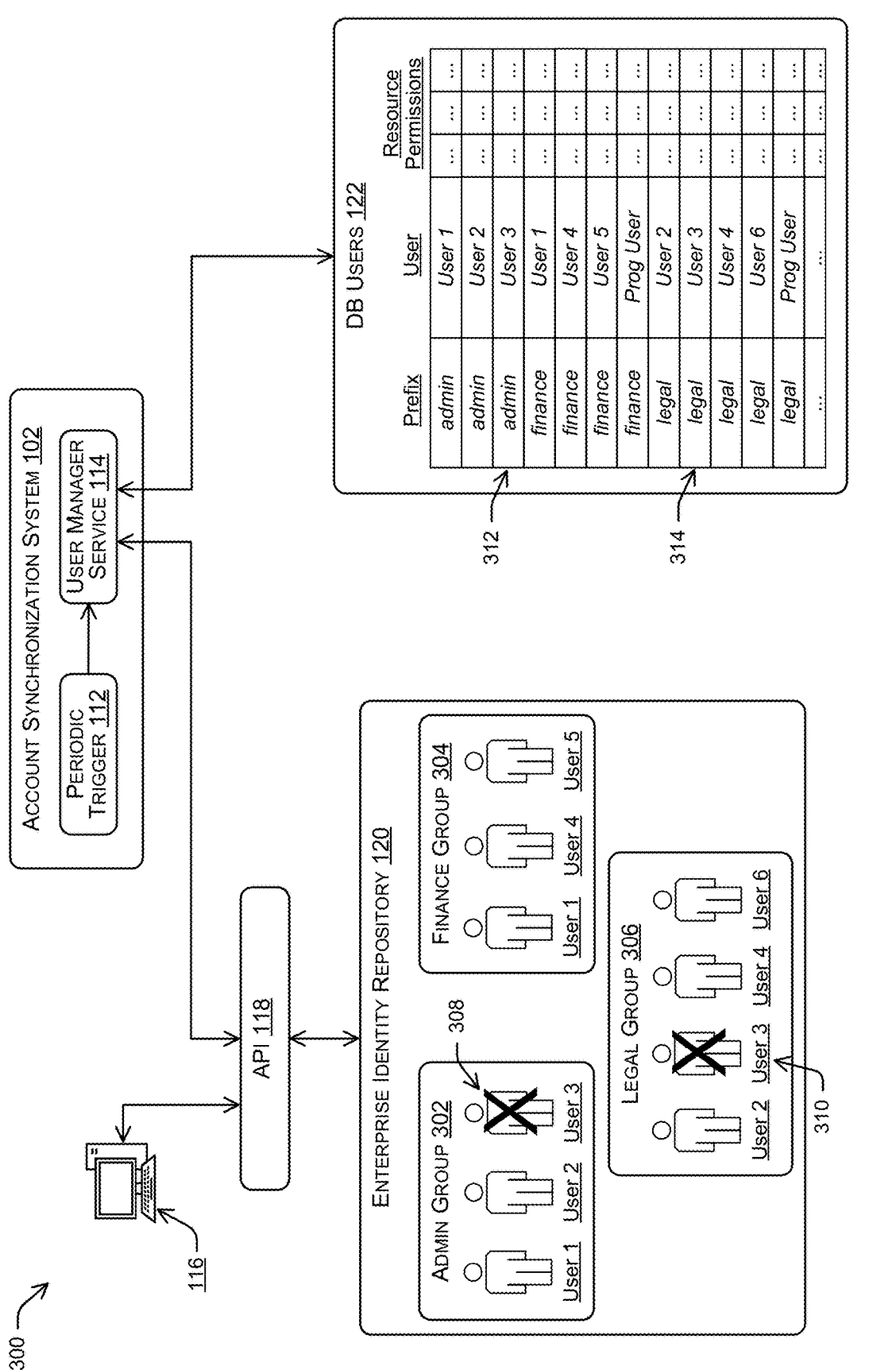
FIG. 3 depicts an example of modifying a set of database user accounts based on the removal of a user from a user group of an enterprise identity repository, in accordance with one or more examples of the present disclosure.

FIG. 3 illustrates a first example 300 of a database user account synchronization performed by the account synchronization system 102. In this example, a number of database user accounts may be identified and removed based on the removal of a user within the EIR 120. The operations described in this example may be similar or identical to the operations described above in FIG. 2. For instance, the synchronization in example 300 may be initiated by a periodic trigger 112 (e.g., a time-based trigger and/or event-based trigger) and may be performed by a user manager service 114 using some or all of operations 204-216 described above.

As noted above, an enterprise identity repository (EIR) 120 maintained by an identity provider service 104 may include listings (e.g., implemented as tables or other data structures) defining various user roles within the organization. In this example, the EIR 120 includes an admin group 302 defining the listing of users in the organization having an administrative role (and corresponding administrative access to the organization's data resources), a finance group 304 defining the listing of users in the finance department of the organization (and corresponding access to financial data and resources of the organization), and a legal group 306 defining the listing of users in the legal department of the organization (and corresponding access to legal data and resources of the organization). It can be understood that the groups 302-306 are examples only, and that in other examples an EIR 120 of an identity provider can include user role mappings for any number of different roles defined by the organization (e.g., employment-based roles, security access-based roles, job title-based roles, office location-based roles, etc.).

In this example, the organization's EIR 120 has been updated to remove a user ("User 3") from the admin group 302 and from the legal group 306. The removal of User 3 from these roles may be performed, for example, by an authorized user of the organization via a client device 116. For instance, the removal of User 3 from the admin group 302 and from the legal group 306 may be performed by a human resources employee (or automated process) in response to User 3 leaving the organization. Operation 308 represents an authorized user of the organization removing User 3 from the admin group 302, and operation 310 represents an authorized user of the organization removing User 3 from the legal group 306.

At a time after the EIR 120 has been updated, the periodic trigger 112 may cause the user manager service 114 to initiate a synchronization of a listing of database user accounts 122. The synchronization in this example may include verifying that the listing of database user accounts 122 maintained by database systems of the organization (e.g., database 106) corresponds to the current state of the user-role-mappings within the EIR 120. Using operations similar or identical to those described in FIG. 2, the user manager service 114 may access the EIR 120 to determine the current user-role mappings for the admin group 302, the finance group 304, and the legal group 306. The user manager service 114 also may access the database user accounts 122 of the database 106, to determine the listings of (non-programmatic) database users associated with each role. In this example, the database user accounts include prefixes corresponding to their role(s) within the organization.

Based on comparing the listings of users within the admin group 302, the finance group 304, and the legal group 306, within the corresponding listing of database user accounts 122 in the database 106, the user manager service 114 may add, remove, and/or modify the listing of database user accounts 122 to synchronize with the current mappings in the EIR 120. In this example, the user manager service 114 may remove item 312 and item 314 within the database user accounts 122, thereby removing User 3's database access permissions for the admin and legal roles within the organization.

In some examples, each time the user manager service 114 synchronizes the EIR 120 with the database user accounts 122, the user manager service 114 may retrieve both the updated user-role mappings from the EIR 120 and the current listing of database user accounts 122 (e.g., including prefixes and/or access permissions, etc.) from the database 106. That is, the account synchronization system 102 may connect to and query both the identity provider service 104 and the database 106 (or multiple databases) during each synchronization.

However, in other examples, the user manager service 114 may maintain a snapshot of a previous state of the user-role mappings in the EIR 120, such as from a previous query of the EIR 120 user-role mappings at a previous time. In these examples, when the user manager service 114 performs a synchronization, it may retrieve the current state of the user-role mappings from the EIR 120 and compare the current mappings to the previous state of the mappings stored by the account synchronization system 102. When the user-role mappings in the EIR 120 have not changed from the previously stored set of mappings, the user manager service 114 may end the synchronization process and need not connect to or query the database user accounts 122.

Figure 4:
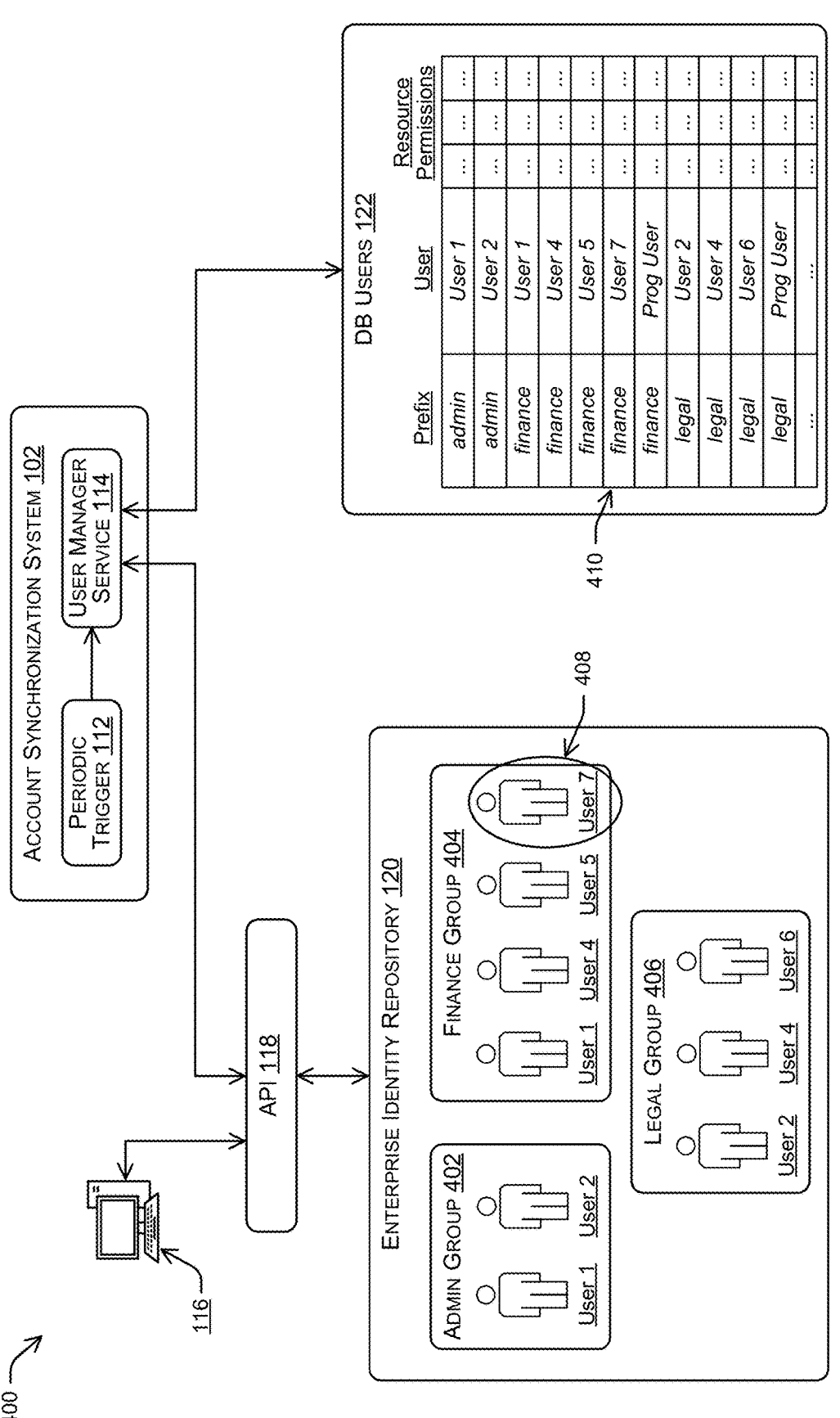
FIG. 4 depicts an example of modifying a set of database user accounts based on the addition of a user to a user group of an enterprise identity repository, in accordance with one or more examples of the present disclosure.

FIG. 4 illustrates a second example 400 of a database user account synchronization performed by the account synchronization system 102. In this example, a database user account is added based on a user added to a role within the EIR 120. As in the above examples, the synchronization in example 400 may be initiated by a periodic trigger 112 and may be performed by a user manager service 114 using some or all of the operations described above. As in the above example, the EIR 120 in FIG. 4 includes an admin group 402, a finance group 404, and a legal group 406 corresponding to distinct roles and resource access permissions defined by the organization.

In this example, the organization's EIR 120 has been updated to add a new user ("User 7") to the finance group 404. The addition of User 7 from this role may be performed, for example, by a human resources officer or other authorized user of the organization, in response to User 7 joining the organization. Operation 408 represents an authorized user of the organization adding User 7 to the finance group 404 of the organization.

At some time after the EIR 120 has been updated, the periodic trigger 112 may cause the user manager service 114 to initiate a synchronization of the listing of database user accounts 122. The synchronization may include verifying that the listing of database user accounts 122 corresponds to the current state of the user-role-mappings within the EIR 120. In this example, the user manager service 114 may access the EIR 120 to determine the current user-role mappings for the admin group 402, the finance group 404, and the legal group 406. The user manager service 114 also may access the database user accounts 122 of the database 106, to determine the listings of (non-programmatic) database users associated with each role. Based on comparing the listings of users within the finance group 404 to the corresponding listing of database user accounts 122 in the database 106, the user manager service 114 in this example may add item 410 into the listing of database user accounts 122, to indicate the addition of User 7 into the finance group, thereby adding database access permissions for User 7 to access the financial data and resources of the organization.

Figure 5:
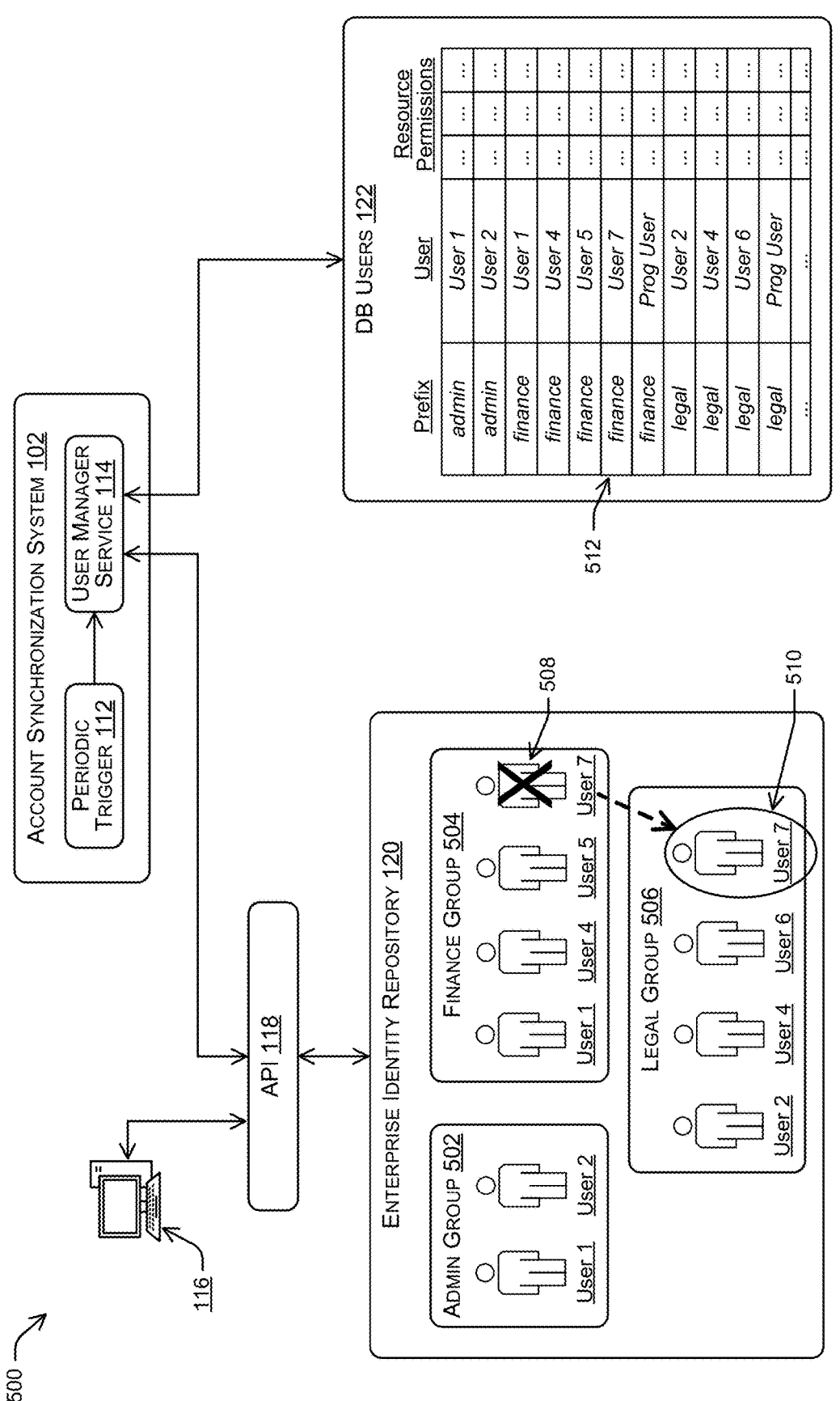
FIG. 5 depicts an example of modifying a set of database user accounts based on the modification of a user between user groups of an enterprise identity repository, in accordance with one or more examples of the present disclosure.

FIG. 5 illustrates a third example 500 of a database user account synchronization performed by the account synchronization system 102. In this example, database user accounts are added and deleted based on a user being moved from one group to another within the EIR 120. As in the above examples, the synchronization in example 500 may be initiated by a periodic trigger 112 and may be performed by a user manager service 114 using some or all of the operations described above. As in the above example, the EIR 120 in FIG. 5 includes an admin group 502, a finance group 504, and a legal group 506 corresponding to distinct roles and resource access permissions defined by the organization.

In this example, the organization's EIR 120 has been updated to move an existing user ("User 7") from the finance group 504 to the legal group 506. The movement of User 7 from the finance group to the legal group may be performed, for example, by a human resources officer or other authorized user of the organization, in response to User 7 changing jobs within the organization. Operation 508 represents an authorized user removing User 7 from the finance group, and operation 510 represents an authorized user adding User 7 to the legal group At some time after the EIR 120 has been updated, the periodic trigger 112 may cause the user manager service 114 to initiate a synchronization of the listing of database user accounts 122. The synchronization may include verifying that the listing of database user accounts 122 corresponds to the current state of the user-role-mappings within the EIR 120. In this example, the user manager service 114 may access the EIR 120 to determine the current user-role mappings for the admin group 502, the finance group 504, and the legal group 506. The user manager service 114 also may access the database user accounts 122 of the database 106, to determine the listings of (non-programmatic) database users associated with each role. Based on comparing the listings of users within the finance group 504 and the legal group 506 to the corresponding listing of database user accounts 122 in the database 106, the user manager service 114 in this example may modify item 512 in the listing of database user accounts 122, to change the prefix of item 512 from "finance" to "legal," thereby changing the database access permissions for User 7 to restrict User 7 from accessing the financial data and resources of the organization, but allowing User 7 to access the legal data and resources of the organization.

As described above, the account synchronization system 102 may be configured in some examples to synchronize only the non-programmatic users in the identity provider service with the corresponding non-programmatic users in the database systems. In these examples, the account synchronization system 102 may be configured not to retrieve and/or configured to ignore any programmatic users in the EIR 120 and within the database user accounts 122. However, in other examples, the account synchronization system 102 also may be configured to synchronize programmatic users (e.g., additionally or alternatively to non-programmatic users). When synchronizing programmatic users, the account synchronization system 102 may use similar or identical techniques to those described herein for synchronizing non-programmatic users. For instance, the identity provider service 104 also may maintain user-role mappings of programmatic users, either as separate groups for pro-grammatic/non-programmatic users, or as intermingled groups with programmatic and non-programmatic users together. In systems when programmatic users/groups are maintained by the identity provider service 104, the account synchronization system 102 may retrieve these user-role mappings from the EIR 120, and retrieve and manage the corresponding programmatic database user accounts using similar techniques to those described herein. In some instances, database systems 106-110 may store user credentials (e.g., login credentials) for programmatic users, but not for human and/or non-programmatic users. In such examples, when synchronizing and managing programmatic users, the account synchronization system 102 may either obtain database system credentials from the IAM 202 of the cloud service provider, or may login directly to the database systems 102-106 using the credentials of the programmatic users.

Figure 6:
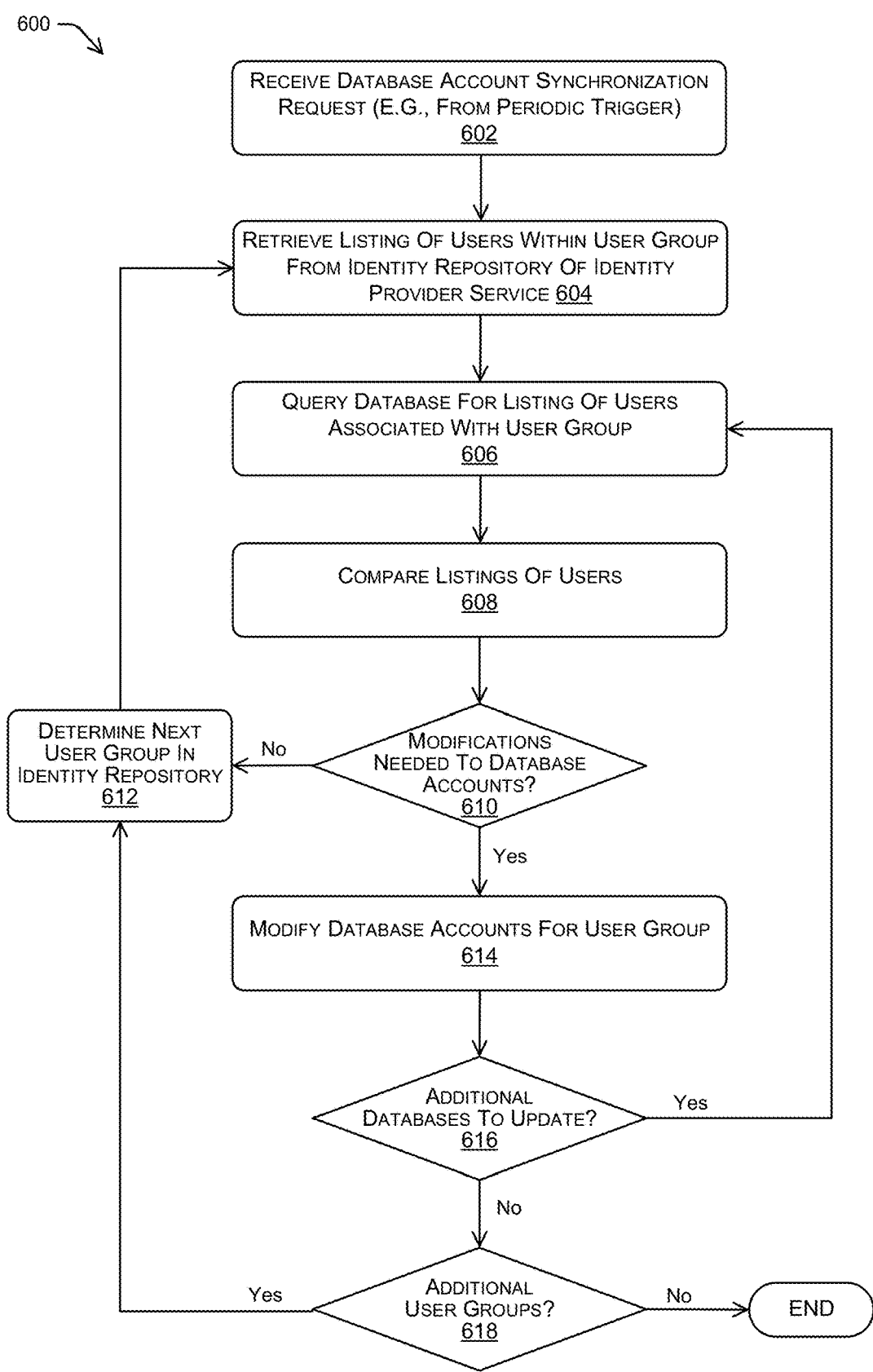
FIG. 6 depicts an example process of modify a set of database user accounts based on changes to the user-role mappings retrieved from an identity provider, in accordance with one or more examples of the present disclosure.

FIG. 6 is a flow diagram illustrating an example process 600 of modifying a set of database user accounts within database systems (e.g., databases 106-110) based on changes to the user-role mappings maintained by an identity provider service 104. In various examples, process 600 may be performed by an account synchronization system 102, including or in combination with any of the various components described above in FIGS. 1-5. As described below, the process 600 may be initiated based on a periodic trigger 112, which may include a time-based trigger initiated periodically and/or an event-based trigger responsive to changes within the EIR 120.

At operation 602, the account synchronization system 102 may receive a request to synchronize one or more database user accounts with the user-role mappings in an identity provider associated with the organization. As described above, the request in operation 602 may be initiated by a periodic trigger 112, which may include a time-based and/or event-based trigger. In other examples, the request in operation 602 may be an external request received by the account synchronization system 102 from an authorized access user or a programmatic process of the organization. The request may be received by the user manager service 114 of the account synchronization system 102, which may receive and respond to the request by performing the functionality of operations 604-618 described below.

At operation 604, the account synchronization system 102 may retrieve a listing of users within a user group (or role) from an identity repository maintained by an identity provider service 104. The listing of users may be retrieved from the user-role mappings within an EIR 120 maintained by the identity provider service 104. As an example, the listing received in operation 604 may correspond to a listing of the organization's users who are designated as admins (e.g., members of the administrator role) defined by the identity provider. In other examples, the user group (or role) for which the user listing is retrieved in operation 604 may include any number of different roles defined by the organization, including but not limited to employee status roles, security access roles, roles based on job title, office location, etc. In some examples, operation 604 may include the account synchronization system 102 accessing the identity provider service 104 via an OIDC login, and receiving from the identity provider service 104 a token (e.g., a JSON web token) or other encrypted token containing source identity information (e.g., an email address) associated with the user.

At operation 606, the account synchronization system 102 may query a listing of database user accounts to retrieve a listing of users having access permissions associated with the role. For example, for an admin user group within the identity provider, the account synchronization system 102 may query a listing of database user accounts 122 for users having a particular prefix associated with the admin user group. In some examples, the account synchronization system 102 may use a token received from the identity provider service 104 associated with the user (e.g., a JSON web token) to retrieve the corresponding set of cloud provider credentials, and then may use the cloud provider credentials to access the database user accounts 122 of the database 106.

At operation 608, the account synchronization system 102 may compare the listing of users retrieved in operation 604 (e.g., based on the user-role mappings received from the identity provider) with the listing of users retrieved in operation 606 (e.g., retrieved from the database user accounts of a database system). The comparing in operation 604 may include verifying that the two lists of users match. For example, the account synchronization system 102 may iterate through every user in the database user accounts (e.g., including access users but not programmatic users) and confirm that a corresponding user identity exists in the user-role mapping for the user group received from the identity provider service 104.

At operation 610, the account synchronization system 102 may determine whether one or more modifications are needed to the database user accounts, based on discrepancies between the listings of users retrieved in operation 604 and in operation 606. In some examples, the determination in operation 610 may be based on the comparison in operation 608 (and/or additional factors relating to the time, the extent, and/or the severity of a security vulnerability caused by a discrepancy between the database user accounts and the user-role mappings, etc.).

When no modifications are needed to the database user accounts (610: No), then in operation 612 the account synchronization system 102 may determine a next user group maintained by the identity provider service 104 to be synchronized. As an example, after synchronizing the admin group, operation 612 may include identifying a different user group (or role) defined by the identity provider to synchronize (e.g., a user role representing all employee users, users within the legal department, users within the London office, etc.). As noted above, the account synchronization system 102 may perform synchronization in which all of the user roles within identity provider service 104 are synchronized. In other examples, the account synchronization system 102 may determine a subset of the user roles to be synchronized, such as a subset of the roles with access to the most secure data and resources, etc. Additionally or alternatively, the account synchronization system 102 may implement different schedules (e.g., different frequencies) and/or different event-based triggers to synchronize the different roles within the identity provider service 104.

When one or more modifications are needed to the database user accounts (610: Yes), then in operation 614 the account synchronization system 102 may add, remove, or modify the database user accounts 122 as needed, so that the listing of database user accounts 122 is synchronized with the current user-role mappings maintained by the identity provider service 104.

At operation 616, after synchronizing the listing of database user accounts 122, within a particular database 106 and for the particular role, the account synchronization system 102 may determine whether any additional databases used by the organization are to be synchronized. As discussed above, an organization may be associated with any number of databases, including databases having different underlying servers and/or architectures, databases within different computing environments, and databases using and not using proxies. The account synchronization system 102 may be database agnostic and may be compatible with any combination of the databases 106-110 that the organization may use. When the account synchronization system 102 determines that one or more additional databases are to be updated (616: Yes), then process 600 may return to operation 606 one or more times to perform the synchronization operations 606-614 for the additional databases of the organization.

When the account synchronization system 102 determines that there are no additional databases associated with the organization to be updated (616: No), then at operation 618 the account synchronization system 102 may determine whether any additional user groups (or roles) within the identity provider are to be synchronized. As described above, an identity provider may maintain any number of user groups defined by the organization, and the account synchronization system 102 may be configured to synchronize all of the user groups during a synchronization process, or to synchronize the user groups at different times and/or in different processes (e.g., using different periodic schedules and/or different triggering events).

When the account synchronization system 102 determines that there are one or more additional user groups from the identity provider service 104 to be synchronized (618: Yes), then process 600 may proceed to operation 612 to determine a next user group maintained by the identity provider service 104 to be synchronized. After identifying one or more additional user groups to synchronize in operation 612, the process 600 may return to operation 604 where the account synchronization system 102 may retrieve the listing of users for the additional user groups from the EIR 120, and then may perform operations 606-614 to synchronize the database user accounts 122-126 for the additional user group.

Figure 7:
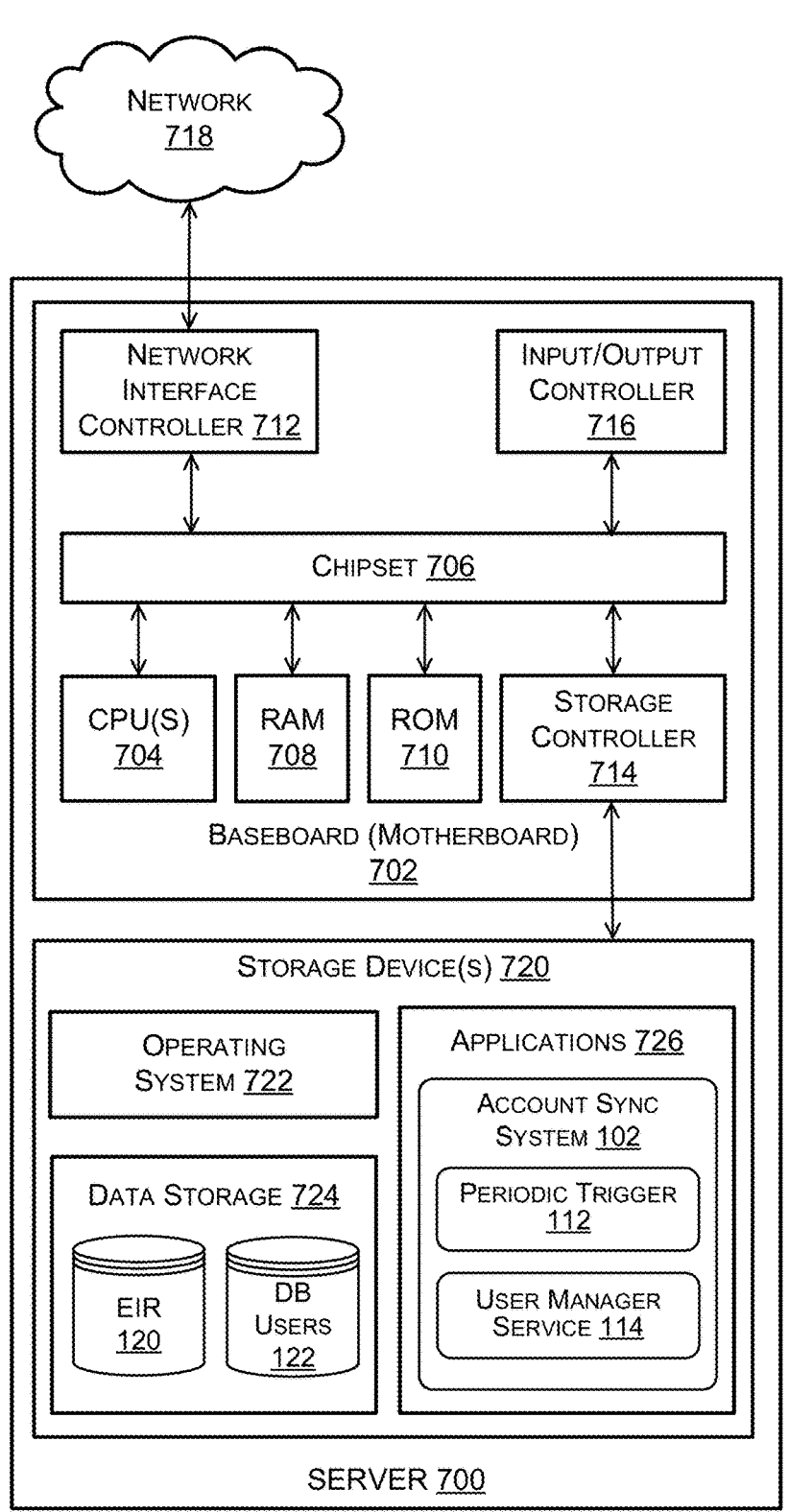
FIG. 7 is an example architecture of a computer server capable of executing program components for implementing various techniques described herein.

FIG. 7 shows an example architecture of a computer server 700 capable of executing program components for implementing the various functionality described herein. Although the computer architecture in this example is labeled as a server, it can be understood from this disclosure that similar or identical computer architectures may be implemented via workstations, desktop or laptop computers, tablet computers, network appliances, mobile devices (e.g., smartphones, etc.) or other computing device, and/or virtual machines or cloud-based computing solutions, any or all of which may execute any combination of the software components described herein. The server 700 may, in some examples, correspond to any of the computing systems or devices described above, such as an account synchronization system 102, a server hosting an identity provider service 104, a database system 106-110, a server or system within a cloud-based computing environment, and/or any other computing devices, systems, or components executing the software components described herein. It will be appreciated that in various examples described herein, a server 700 might not include all of the components shown in FIG. 7, may include additional components that are not explicitly shown in FIG. 7, and/or may utilize a different architecture from that shown in FIG. 7.

The server 700 includes a baseboard 702, or "motherboard," which may be a printed circuit board to which a multitude of components or devices are connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the server 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the server 700. The chipset 706 can further provide an interface to a computer-readable storage medium such as a ROM 710 or non-volatile RAM ("NVRAM") for storing basic routines that help to startup the server 700 and to transfer information between the various components and devices. The ROM 710 or NVRAM can also store other software components necessary for the operation of the server 700 in accordance with the configurations described herein.

The server 700 can operate in a networked environment using logical connections to remote computing devices and computer systems through a network, such as the network 718, which may be similar or identical to any of the communication networks discussed above. The chipset 706 also may include functionality for providing network connectivity through a Network Interface Controller (NIC) 712, such as a gigabit Ethernet adapter. The NIC 712 is capable of connecting the server 700 to other computing devices (e.g., account synchronization systems 102, cloud service providers, etc.) over the network 718. It should be appreciated that multiple NICs 712 can be present in the server 700, connecting the computer to other types of networks and remote computer systems. In some instances, the NICs 712 may include at least on ingress port and/or at least one egress port.

The server 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device.

The server 700 can include one or more storage device(s) 720, which may be connected to and/or integrated within the server 700, that provide non-volatile storage for the server 700. The storage device(s) 720 can store an operating system 722, data storage systems 724, and/or applications 726, which are described in more detail herein. The storage device(s) 720 can be connected to the server 700 through a storage controller 714 connected to the chipset 706. The storage device(s) 720 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server 700 can store data on the storage device(s) 720 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device(s) 720 are characterized as primary or secondary storage, and the like.

For example, the server 700 can store information to the storage device(s) 720 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server 700 can further read information from the storage device(s) 720 by detecting the physical states or characteristics of one or more particular locations within the physical storage units.

In addition to the storage device(s) 720 described above, the server 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the server 700. In some examples, the various operations performed by the computing systems described herein (e.g., account synchronization system 102, identity provider service 104, databases 106-110, etc.) may be implemented within a datacenter including one or more servers or devices similar to server 700. For instance, some or all of the operations described herein may be performed by one or more server 700 operating in a networked (e.g., client-server or cloud-based) arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device(s) 720 can store an operating system 722 utilized to control the operation of the server 700. In some examples, the operating system 722 comprises a LINUX operating system. In other examples, the operating system 722 comprises a WINDOWS® SERVER operating system from MICROSOFT Corporation of Redmond, Washington. In further examples, the operating system 722 can comprise a UNIX operating system or one of its variants. It should be appreciated that other operating systems can also be utilized. The storage device(s) 720 can store other system or application programs and data utilized by the server 700.

In various examples, the storage device(s) 720 or other computer-readable storage media is encoded with computer-executable instructions which, when loaded into the server 700, transform the computer from a general-purpose computing system into a special-purpose computer capable of implementing various techniques described herein. These computer-executable instructions transform the server 700 by specifying how the CPUs 704 transition between states, as described above. In some examples, the server 700 may have access to computer-readable storage media storing computer-executable instructions which, when executed by the server 700, perform the various techniques described herein. The server 700 can also include computer-readable storage media having instructions stored thereupon for performing any of the other computer-implemented operations described herein.

As illustrated in FIG. 7, the storage device(s) 720 may store one or more data storage systems 724 configured to store data structures and other data objects. In some examples, data storage systems 724 may include one or more data stores, which may be similar or identical to the EIR 120 and/or listings of database user accounts 122-126 described above. Additionally, the software applications 726 stored on the server 700 may include one or more client applications, services, and/or other software components.

For example, application(s) 726 may include any combination of the components of the account synchronization system 102 and/or any other software components described above in reference to FIGS. 1-6.

As illustrated by the above examples, the techniques described herein provide technical advantages that improve the security and functionality of computing systems and environments used by large organizations. For example, by performing the periodic and automated synchronization of database user accounts with the current user-role mappings of the identity provider service, the account synchronization system 102 may effectively prevent data security vulnerabilities resulting from users leaving or changing roles within an organization. Additionally, because the account synchronization system 102 may provide one-to-one mappings between the users within the EIR 120 and users within the listings of (non-programmatic) database user accounts 122, these techniques provide additional advantages of improved database tracking and analysis of user connections and transactions. For instance, in contrast to database systems that generate shared or ad hoc database user accounts, each connection and action performed within the database systems 106-110 can be accurately linked to a specific organization user. Further, the account synchronization system 102 described herein provides compatibility with multiple cloud providers that may be used by an organization, and with any number of separate and independent database systems using various underlying servers and/or architectures.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A computer system, comprising:
one or more processors; and one or more non-transitory computer-readable media storing computer-executable instructions that, when executed by the one or more processors, cause the one or more processors to perform operations comprising:
receiving a request to synchronize one or more database user accounts associated with a cloud service provider, based on a current state of an identity provider service;
accessing, using first credentials, the identity provider service to determine a mapping of a first resource access role to a first user identity;
receiving, from the identity provider service, a first encrypted web token associated with the first user identity;
logging into the cloud service provider using the first encrypted web token associated with the first user identity;
receiving, from the cloud service provider, and based on successfully logging into the cloud service provider using the first encrypted web token, second credentials associated with the first user identity and different from the first credentials;
accessing a first database system associated with the cloud service provider, to determine a first database user account associated with the first user identity; and
modifying the first database user account within the first database system, based at least in part on the mapping, wherein modifying the first database user account within the first database system is performed using the second credentials from the cloud service provider.

2. The computer system of claim 1, wherein receiving the request to synchronize the one or more database user accounts is based on a periodic time-based synchronization trigger.

3. The computer system of claim 1, the operations further comprising, in response to receiving the request to synchronize the one or more database user accounts:
accessing a plurality of database systems associated with the cloud service provider, including the first database system and a second database system, wherein the first database system is implemented using first database management architecture, and the second database system is implemented using different second database management architecture;
determining, within the second database system, a second database user corresponding to the first user identity; and
modifying the second database user within the second database system, based at least in part on the mapping.

4. The computer system of claim 1, the operations further comprising:
accessing the identity provider service to determine a second mapping of a second resource access role to the first user identity, wherein modifying the first database user account is further based at least in part on the second mapping.

5. The computer system of claim 1, wherein determining the mapping of the first resource access role to the first user identity comprises:
invoking an application programming interface of the identity provider service; and
receiving, via the application programming interface, a first listing of user identities associated with the first resource access role.

6. The computer system of claim 5, wherein determining the first database user account corresponding to the first user identity comprises:

determining a prefix associated with the first resource access role;

querying the first database system to retrieve a second listing of database users associated with the prefix; and comparing the first listing of user identities to the second listing of database users.

7. The computer system of claim 1, wherein accessing the first database system comprises initiating a connection to the first database system, wherein the connection is not made through a proxy.

8. A method, comprising:

receiving a request to synchronize one or more database user accounts based on a current state of an identity provider service;

accessing, using first credentials, the identity provider service to determine a mapping of a first resource access role to a first user identity;

receiving, from the identity provider service, a first encrypted web token associated with the first user identity;

accessing a service provider using the first encrypted web token associated with the first user identity, and retrieving from the service provider second credentials associated with the first user identity and different from the first credentials;

accessing a first database system associated with the identity provider service to determine a first database user corresponding to the first user identity; and modifying the first database user within the first database system, based at least in part on the mapping, wherein modifying the first database user within the first database system is performed using the second credentials from the service provider.

9. The method of claim 8, wherein receiving the request to synchronize the one or more database user accounts is based on a periodic time-based synchronization trigger.

10. The method of claim 8, further comprising, in response to receiving the request to synchronize the one or more database user accounts:

accessing a plurality of database systems associated with the identity provider service, including the first database system and a second database system, wherein the first database system is implemented using first database management architecture, and the second database system is implemented using different second database management architecture;

determining, within the second database system, a second database user corresponding to the first user identity; and modifying the second database user within the second database system, based at least in part on the mapping.

11. The method of claim 8, further comprising:

accessing the identity provider service to determine a second mapping of a second resource access role to the first user identity, wherein modifying the first database user is further based at least in part on the second mapping.

12. The method of claim 8, wherein determining the mapping of the first resource access role to the first user identity comprises:

invoking an application programming interface of the identity provider service; and receiving, via the application programming interface, a first listing of user identities associated with the first resource access role.

13. The method of claim 12, wherein determining the first database user corresponding to the first user identity comprises:

determining a prefix associated with the first resource access role;

querying the first database system to retrieve a second listing of database users associated with the prefix; and comparing the first listing of user identities to the second listing of database users.

14. The method of claim 8, wherein accessing the first database system comprises initiating a connection to the first database system, wherein the connection is not made through a proxy.

15. The method of claim 8, wherein determining the mapping of the first resource access role to the first user identity comprises:

invoking an application programming interface of the identity provider service; and receiving, via the application programming interface, a first listing of user identities associated with the first resource access role.

16. The method of claim 15, wherein determining the first database user corresponding to the first user identity comprises:

determining a prefix associated with the first resource access role;

querying the first database system to retrieve a second listing of database users associated with the prefix; and comparing the first listing of user identities to the second listing of database users.

17. One or more non-transitory computer-readable media storing instructions executable by a processor, wherein the instructions, when executed by the processor, cause the processor to perform operations comprising:

determining, based at least in part on a periodic time-based trigger, a database account synchronization time;

in response to reaching the database account synchronization time, accessing, using first credentials, an identity provider service to determine a mapping of a first resource access role to a first user identity;

receiving, from the identity provider service, a first encrypted web token associated with the first user identity;

accessing a service provider using the first encrypted web token associated with the first user identity, and retrieving from the service provider second credentials associated with the first user identity and different from the first credentials;

accessing a first database system associated with the identity provider service to determine a first database user corresponding to the first user identity; and modifying the first database user within the first database system, based at least in part on the mapping, wherein modifying the first database user within the first database system is performed using the second credentials from the service provider.

18. The one or more non-transitory computer-readable media of claim 17, wherein accessing the first database system comprises initiating a connection to the first database system, wherein the connection is not made through a proxy.

19. The one or more non-transitory computer-readable media of claim 17, wherein determining the mapping of the first resource access role to the first user identity comprises:

invoking an application programming interface of the identity provider service; and receiving, via the application programming interface, a first listing of user identities associated with the first resource access role.

20. The one or more non-transitory computer-readable media of claim 19, wherein determining the first database user corresponding to the first user identity comprises:

determining a prefix associated with the first resource access role;

querying the first database system to retrieve a second listing of database users associated with the prefix; and comparing the first listing of user identities to the second listing of database users.

* * * * *